(12) United States Patent
Husner et al.

(10) Patent No.: US 8,001,688 B2
(45) Date of Patent: Aug. 23, 2011

(54) METHOD FOR PRODUCING ATTACHED PARTS FOR A VEHICLE AND THE THUS PRODUCED ATTACHED PARTS

(75) Inventors: Jens Husner, Wadern (DE); Peter Cornelius, Kasel (DE); Axel Luft, Gusterath (DE)

(73) Assignee: ThyssenKrupp Drauz Nothelfer GmbH, Heilbronn (DE)

(*) Notice: Subject to any disclaimer, the term of this patent is extended or adjusted under 35 U.S.C. 154(b) by 1127 days.

(21) Appl. No.: 10/553,116

(22) PCT Filed: Apr. 2, 2004

(86) PCT No.: PCT/EP2004/003488
§ 371 (c)(1),
(2), (4) Date: Aug. 8, 2006

(87) PCT Pub. No.: WO2004/091843
PCT Pub. Date: Oct. 28, 2004

(65) Prior Publication Data
US 2006/0273620 A1 Dec. 7, 2006

(30) Foreign Application Priority Data
Apr. 15, 2003 (DE) .................................. 103 17 552

(51) Int. Cl.
*B21D 53/88* (2006.01)
(52) U.S. Cl. .... 29/897.2; 29/505; 296/146.5; 296/146.6
(58) Field of Classification Search ............... 29/897.2, 29/505, 509, 525.14; 296/146.5, 146.6, 146.9; 219/121.63
See application file for complete search history.

(56) References Cited

U.S. PATENT DOCUMENTS

| | | | | |
|---|---|---|---|---|
| 2,664,182 A * | 12/1953 | Williams et al. | ........... | 52/784.13 |
| 2,756,312 A * | 7/1956 | Watter | .......... | 219/91.2 |
| 2,889,619 A * | 6/1959 | Robinson | .................... | 228/173.6 |
| 3,909,918 A * | 10/1975 | Takizawa et al. | ............... | 29/509 |
| 4,888,919 A * | 12/1989 | Strosberg et al. | ............... | 49/502 |
| 5,221,585 A * | 6/1993 | Kresse et al. | ................. | 428/573 |
| 5,322,338 A * | 6/1994 | Hirakami | ..................... | 296/151 |
| 5,941,590 A * | 8/1999 | Reynolds et al. | ............. | 296/39.1 |
| 6,109,682 A * | 8/2000 | Zimmer | ...................... | 296/146.9 |
| 6,464,286 B2 * | 10/2002 | Heuel | .......... | 296/146.9 |
| 6,523,244 B1 * | 2/2003 | Bissonnette | .................... | 29/509 |
| 2001/0029702 A1 | 10/2001 | Heuel | | |

FOREIGN PATENT DOCUMENTS

| | | |
|---|---|---|
| DE | 199 32 415 | 2/2001 |
| EP | 0 200 997 | 11/1986 |
| EP | 200997 A2 * | 11/1986 |
| WO | WO 03/022612 | 3/2003 |

* cited by examiner

Primary Examiner — David P Bryant
Assistant Examiner — Bayan Salone
(74) Attorney, Agent, or Firm — McGlew and Tuttle, P.C.

(57) ABSTRACT

A method for producing attached parts for a motor vehicle, for example doors, dampers, mudguards formed by internal (1) and external (2) sheets. The external sheet (2) is inward bent in the visible areas of the door or attached part, the sheet edges being practically parallel to the plane of attached parts in the invisible (not apparently visible) areas of the door or attached part. The internal sheet (1) is pushed against the external sheet (2) in a flanged area in such a way that a small accurately defined gap for laser welding is produced. The internal (1) and external (2) sheets are welded to each other in the form of an overlap joint in the opposite invisible areas, thereby compensating tolerances.

20 Claims, 5 Drawing Sheets

Fig. 3   A-A
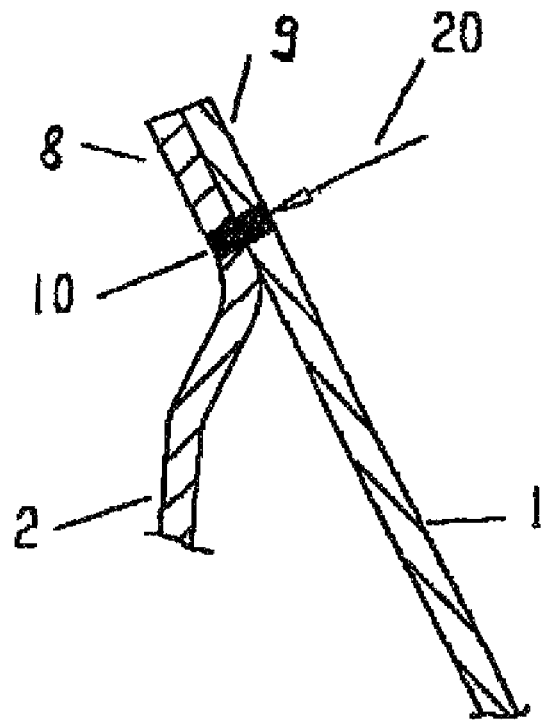
Fig. 4a   B-B
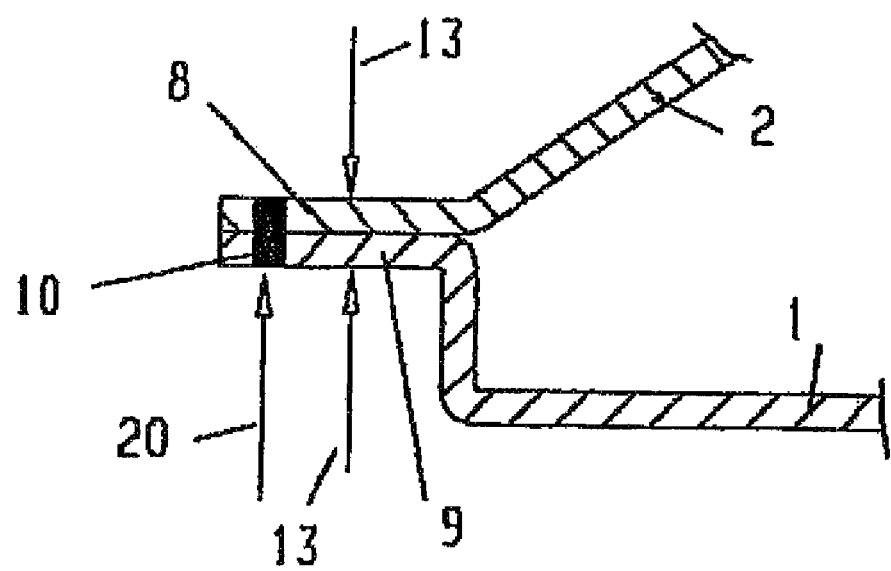

Fig. 4b   B-B
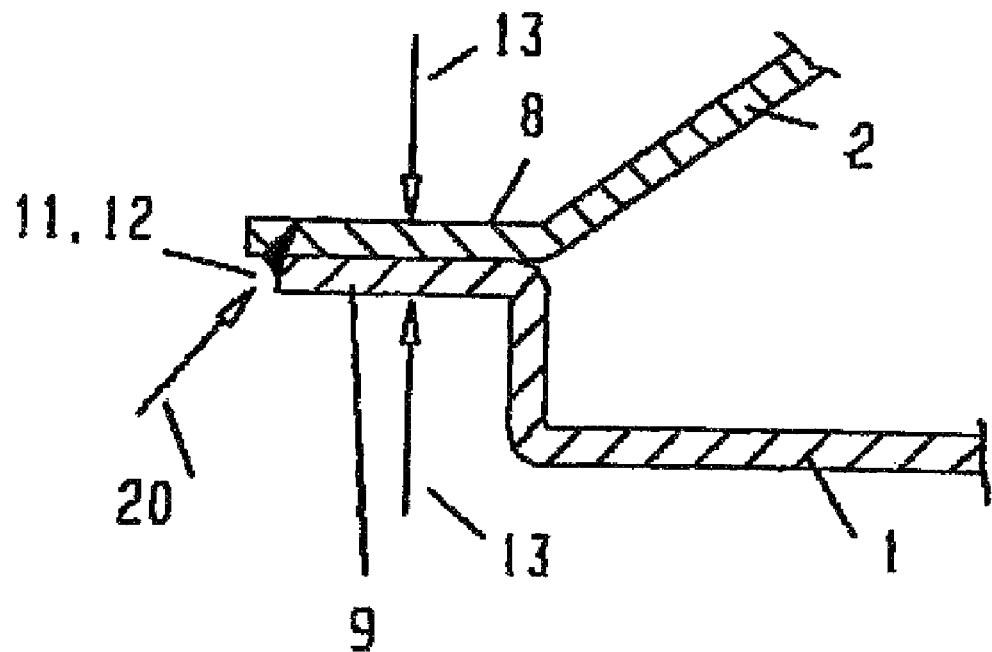
Fig. 4c   B-B
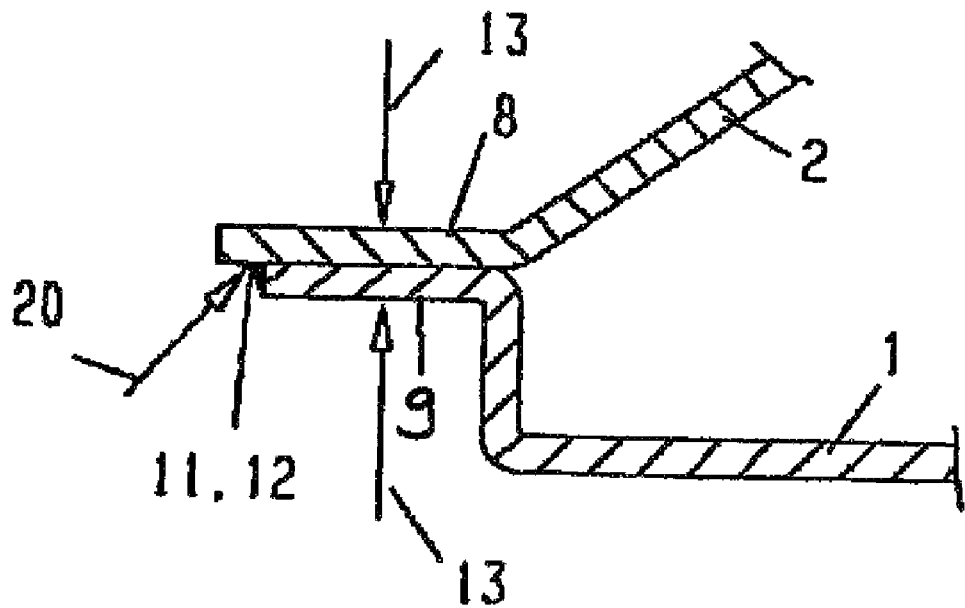

Fig. 5 C-C
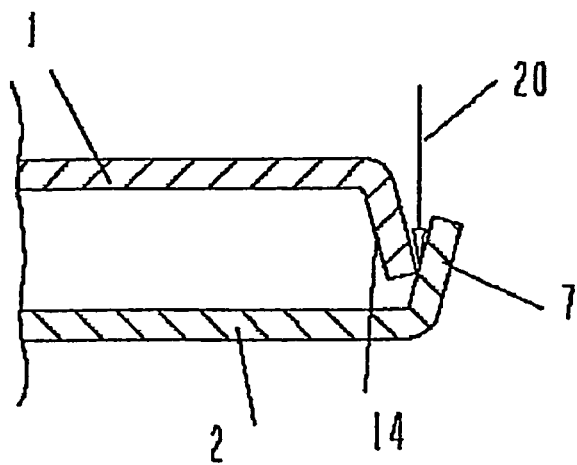
Fig. 6 C-C
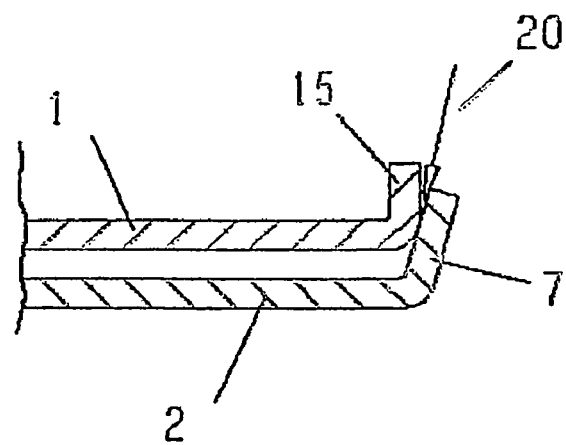
Fig. 7 C-C
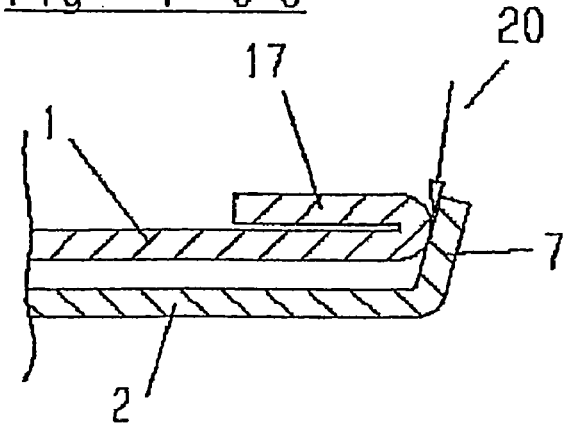

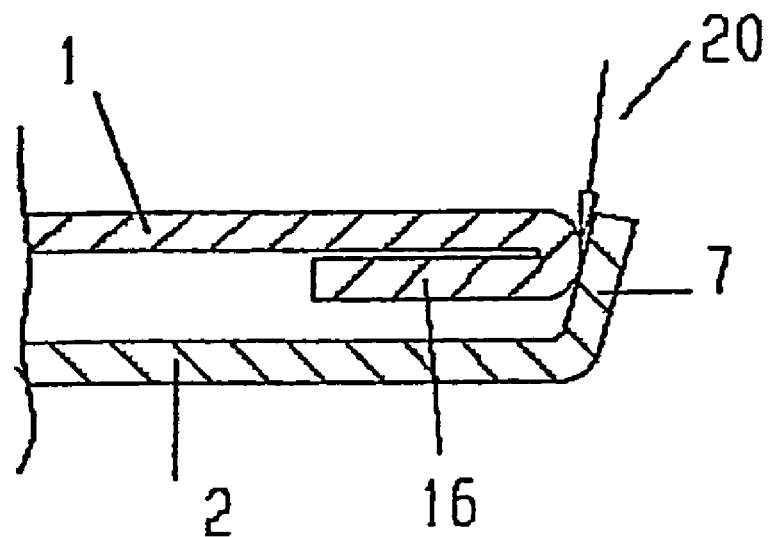
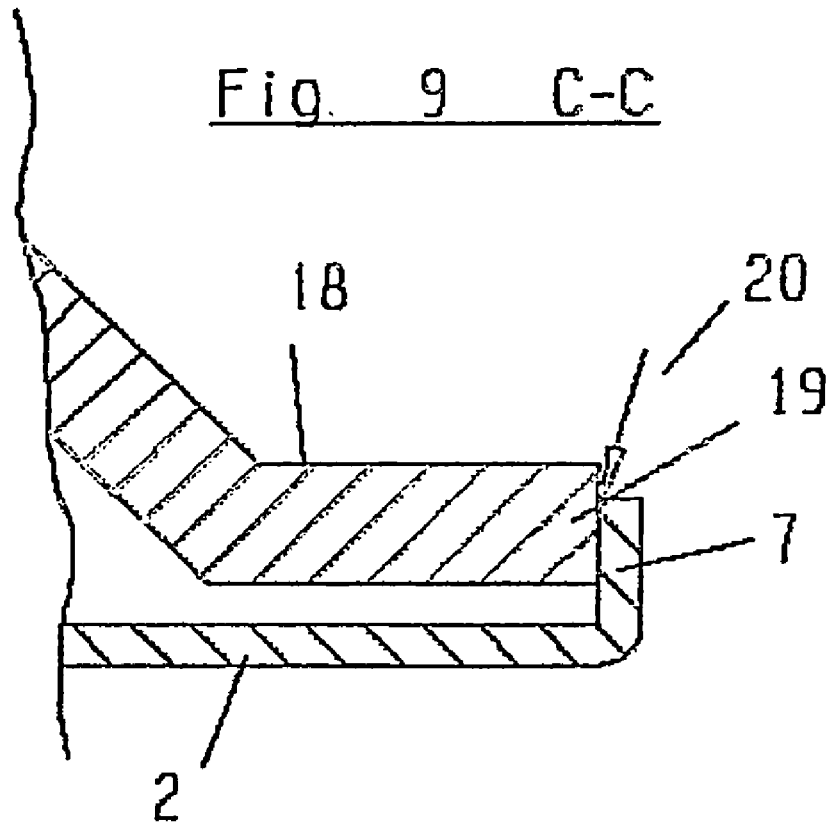

METHOD FOR PRODUCING ATTACHED PARTS FOR A VEHICLE AND THE THUS PRODUCED ATTACHED PARTS

CROSS REFERENCE TO RELATED APPLICATIONS

This application is a U.S. National Phase application of International Application PCT/EP2004/003488 filed Apr. 2, 2004 and claims the benefit of priority under 35 U.S.C. §119 of German Application DE 103 17 552.0 filed Apr. 15, 2003, the entire contents of which are incorporated herein by reference.

FIELD OF THE INVENTION

The invention relates to a method for producing attached parts for a motor vehicle, for example doors, dampers, mudguards formed by at least one internal sheet and at least one external sheet, said sheets being produced separately from each other and subsequently joined together at their edges, and the invention also relates to an attached part for a motor vehicle produced in accordance with such a method.

BACKGROUND OF THE INVENTION

In general, it is state of the art in technology to join internal sheets and external sheets by flanging. This method calls for high dimensional accuracy of those components to be joined and it might be required to take additional measures, e.g. applying an adhesive to obtain a lasting connection.

EP 200 997 B1 discloses a welded connection of two light-gauge sheets, of which one external sheet forms an optically smooth exterior surface, the edge of which is flanged by 180° onto its rear area, and wherein the internal sheet is laid onto the flanged edge of the external sheet, and wherein the connection of the internal sheet with the flanged edge is made by a laser beam from the side averted from the exterior surface. In addition, the internal sheet in the edge area can also be flanged by 180°.

EP 855 965 B1 discloses a motor vehicle door with an internal sheet and an external sheet, wherein the edge strips of the internal sheet and of the external sheet are bent and wherein the edge strips of these sheets laid one above the other are welded together by a laser beam directed into the gap between the two edge strips. The vertical bend at the entire circumference of the sheets with the smallest possible joining gap involves a sophisticated box-like stacking and positioning of the components to each other. The gap which is required for box-like stacking is then formed between the sides lying opposite to each other, thus constituting the joining gap. The required component tolerances can hardly be met in deep drawing. It is also disadvantageous that the gap cannot be influenced any more by shifting the inner part. The gap can only be reduced by deformation of the external sheet, whereby the strains and stresses thus occurring may affect the outer skin and produce dips.

DE 100 37 303 A1 describes a method for producing a motor vehicle door, wherein the door inner part is entirely or partly made of aluminum and the door external sheet is completely made of aluminum. According to this method, the edge area of the door external sheet at the entire circumferential area is inwardly bent by approx. 90° and brought in contact at a machined front area of the door inner part to allow for executing the laser welding operation. In producing this door, too, positioning and box-like stacking is difficult, leading to the a.m. problematic situation concerning tolerance, gap, and dips.

Furthermore known from DE 199 32 415 C1 is a method according to this species for laser beam welding of a motor vehicle door or motor vehicle damper, wherein the edges of the sheets to be joined are inwardly bent in the same direction at the entire circumference of the door and wherein the sheets are welded together in the edge area of the edge strips, maintaining a certain space for degassing. With this method, too, a uniformly thin joining gap must be established at the entire circumference, involving substantial expenditure for laser welding.

SUMMARY OF THE INVENTION

Now, therefore, it is the task of the present invention to provide a method for producing an attached part that allows for high process safety based upon simplified box-like stacking and positioning of the joining components to each other while reducing the joining gaps at the same time.

According to the invention, a method for producing an attached part provides for that:

the external sheet is inwardly bent at sides visible from outside in the edge area of the attached part, and that the pertaining edge areas of the internal sheet are shifted against the bend of the external sheet to minimize the gap, and that the internal sheet and external sheet are welded together by a laser beam directed into the gap between the edge areas of the internal sheet and the bend of the external sheet; and the edges of the external sheet and internal sheet are basically laid on each other in parallel to the component plane at one side at least or at all invisible sides in the edge area of the attached part lying opposite to the visible area(s) and are laser-welded in an overlap joint or laser-welded or laser-soldered in the fillet of the overlapping parts.

Hence, with the method according to the present invention, the internal sheet and external sheet of the attached parts have different joining geometries at the edges which are dependent upon whether or not the joined edge areas at these sides in their final status are visible from outside. At those sides visible from outside in the built-in status of the component, the external sheet in the edge area is inwardly bent, and the internal sheet is accordingly pushed against the bend, and the laser beam is directed into the gap between the two bordering areas for welding. At the edge areas of those sides of the attached part that are not visible in the built-in status of the component, the edges of the external sheet and internal sheet are basically laid one above the other in parallel to the component plane and laser-welded in an overlap joint or laser-welded or laser-soldered in the fillet of the overlapping parts. According to the method being the subject of the present invention, the internal sheets and external sheets can be positioned exactly with high processing safety, particularly at those sides visible from outside, and the inwardly bent bordering edges are largely brought in complete contact or at least the joining gap into which the laser beam is directed is reduced to a minimum by making the tolerance offset at the invisible edges between the internal sheet and external sheet.

It has turned out to be particularly advantageous to inwardly bend and join the visible area of the external sheet at least at the door sill side and/or door lock side of a motor vehicle door. Then, the opposite invisible edge areas of the hinge side and/or window side of the door external sheet lying evenly on each other can be connected to the door internal sheet in the edge areas in the overlap joint by laser welding or in the fillet of the overlapping components by laser welding and laser soldering.

To provide a suitable gap into which the laser beam is directed in exact position, it has turned out to be favorable to arrange the bend of the external sheet at an angle to the external sheet itself being greater than or equal to 90° and/or to inwardly bend the edge of the external sheet by maximally 90°. The edge areas of the internal sheet can then be bent in a suitable manner inwardly or outwardly to allow for joining with the bend, wherein particularly the bends of both sheets form an acute angle. However, the edge areas of the internal sheet can also be bent inwardly or outwardly by up to 180° so that the outer edge at the bend of the external sheet is brought in contact. Finally, it has turned out to be favorable to bevel the front side of the edge area of the internal sheet in such a manner that it also forms an acute angle to the bend of the external sheet. This has proved particularly favorable if the edge area of the internal sheet is particularly thick.

The invention is explained in more detail based upon the enclosed FIG. 1 to 9 by way of an example of a door for motor vehicles. The various features of novelty which characterize the invention are pointed out with particularity in the claims annexed to and forming a part of this disclosure. For a better understanding-of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:
FIG. 3 is a sectional view taken according to Line A-A of FIG. 2;
FIG. 4a is a sectional view according to Line B-B of FIG. 2;
FIG. 4b is a sectional view according to Line B-B of FIG. 2;
FIG. 4c is a sectional view according to Line B-B of FIG. 2;
FIG. 5 is a sectional view showing an embodiment for a section according to Line C-C of FIG. 1;
FIG. 6 is a sectional view showing another embodiment for a section according to Line C-C of FIG. 1;
FIG. 7 is a sectional view showing another embodiment for a section according to Line C-C of FIG. 1;
FIG. 8 is a sectional view showing another embodiment for a section according to Line C-C of FIG. 1;
FIG. 9 is a sectional view showing another embodiment for a section according to Line C-C of FIG. 1.

DESCRIPTION OF THE PREFERRED EMBODIMENTS

Figure 1:
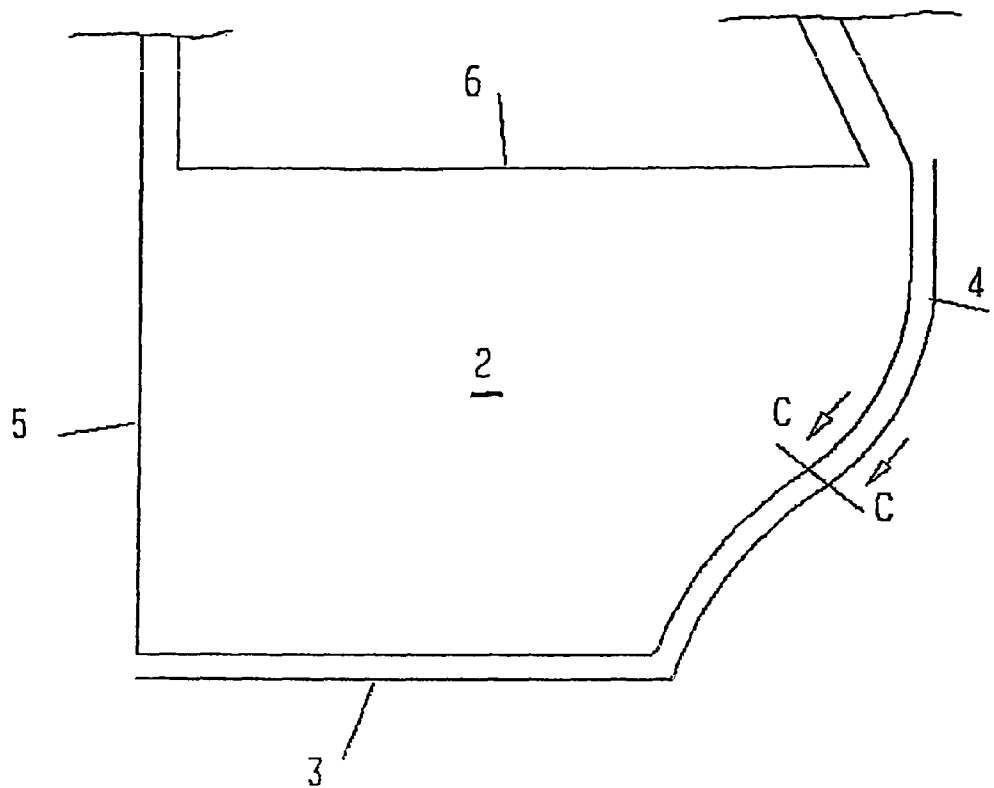
FIG. 1 is a schematic side view of motor vehicle door.
Figure 2:
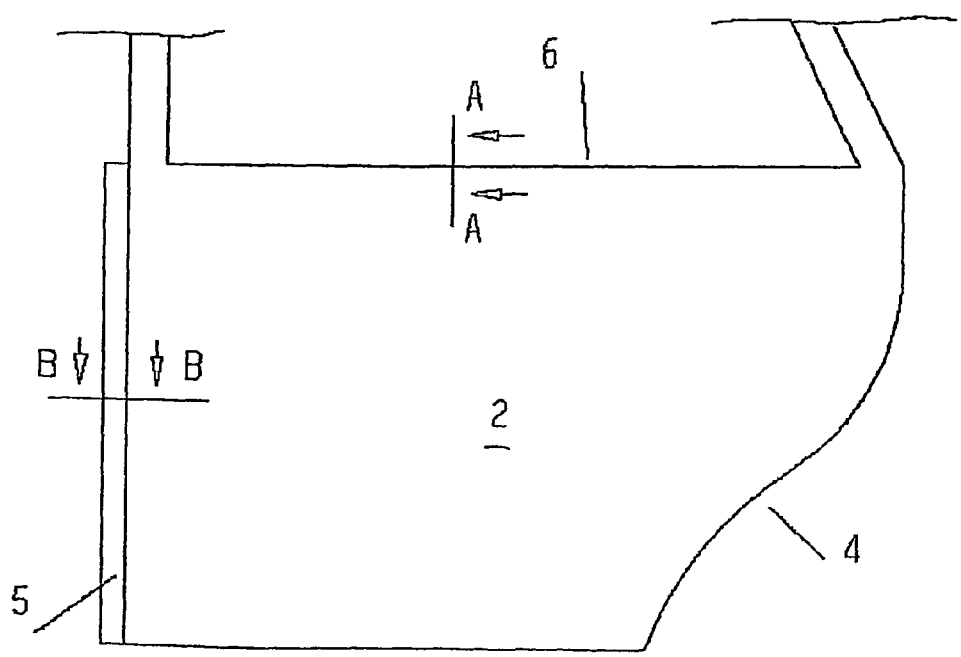
FIG. 2 is a schematic side view of motor vehicle door.

Referring to the drawings in particular, FIG. 1 and 2 show a rear side door of a private motor vehicle in a schematic side view from outside, wherein the sill side 3 and the lock side 4 constitute the so-called visible edge areas, while the hinge side 5 and the window side 6 represent the invisible edge areas of the external sheet 2. According to the present invention, the edges of the external sheet 2 at the sides 3 and 4 are inwardly bent by up to 90°. This bend 7 is illustrated in FIG. 5 to 9. At the opposite sides 5 and 6, the edge areas 8 of the external sheet 2 are no longer visible after attachment of the component, because they disappear, for example, behind the front mudguard or under the window rubber seal. As shown in FIG. 3 and 4a to 4c, these edge areas 8 of the external sheet 2 and the edge areas 9 of the internal sheet 1, for example, are laid one above the other by the aid of clamping grips 13 to allow for the welding operations, so that a laser weld seam 10 is established in the overlap joint (compare FIG. 3 and 4a) or a fillet weld 11 or laser soldering seam 12 (compare FIG. 4b and 4c) is established in the fillet of the overlapping parts by the aid of a laser beam 20.

With a basically identical bend 7 of the external sheet 2, FIG. 5 to 9 show various embodiments for the edge areas 14 to 18 of the internal sheet. In the exterior area, the internal sheet 1 is initially arranged basically in parallel to the external sheet 2. According to FIG: 5, the edge area 14 is then bent to the external sheet 2 by a little less than 90°, so that the laser beam 20 is directed into an acute angle formed by the edge area 14 and the bend 7. According to FIG. 6, both the edge area 15 and the bend 7 are directed towards the private motor vehicle inside and they, too, form an acute angle for the laser beam 20.

In FIGS. 7 and 8, the edge areas are bent by 180° inwardly, edge area 17, and/or outwardly, edge area 16. The external arch of the bent internal sheet 1 is brought in contact at the bend 7, so that the laser beam 20 is directed into the gap formed by the arch and the bend 7 (compare FIGS. 7 and 8).

In FIG. 9, at least the edge area 18 of the internal sheet 1 is much thicker than it is in the other embodiments. Here, the front side 19, which is preferably chamfered additionally, can be brought in contact at the bend 7, so that here, too, the laser beam 20 can be directed into the gap forming an acute angle.

While specific embodiments of the invention have been shown and described in detail to illustrate the application of the principles of the invention, it will be understood that the invention may be embodied otherwise without departing from such principles.

The invention claimed is:

1. A method for producing attached parts for a motor vehicle, including one or more of doors, dampers, mudguards, the method comprising:
   providing an internal sheet and at least one external sheet with said sheets being produced separately from each other, said internal sheet having an outer surface;
   bending the external sheet inwardly by up to 90° at sides visible from a position outside of said at least one external sheet in the edge area of an attached part to form a bent external sheet portion, said bent external sheet portion having an inner surface;
   pushing pertaining edge areas of the internal sheet, in a direction of said inner surface of said bent external sheet portion, against the bent external sheet portion of the at least one external sheet to minimize a gap defined between edge areas of said internal sheet and said bent external sheet portion of said external sheet, said internal sheet being moved relative to said external sheet, in said direction of said inner surface of said bent external sheet portion, to move at least a portion of said outer surface of said internal sheet into contact with at least a portion of said inner surface of said bent external sheet portion;
   welding the internal sheet and the external sheet together by a laser beam directed into the gap between the edge areas of the internal sheet and the bend of the external sheet;
   laying an open end of the external sheet and an open end of the internal sheet on each other in parallel to a component plane at one side at least or at all invisible sides in the edge area of the attached part lying opposite to the visible area(s), wherein said open end of the external sheet and said open end of the internal sheet extend in a direction parallel to the component plane, said open end of said external sheet having an inner external sheet surface, said open end of said internal sheet having an inner internal sheet surface, said inner external sheet surface engaging said inner internal sheet surface, wherein said inner internal sheet surface moves along said inner external sheet surface when said internal sheet is moved relative to said external sheet; and laser-welding in an overlap joint of the open end of the external sheet and the open end of the internal sheet or laser-welded or laser-soldered in a fillet of the overlapping parallel edges of said open end of the external sheet and said open end of said internal sheet after said internal sheet is moved relative to said external sheet.

2. A method according to claim 1, wherein a visible edge area of said external sheet is inwardly bent at a sill side and/or lock side of a door for motor vehicles.

3. A method according to claim 1, wherein the invisible edge areas of a hinge side and/or of a window side of the door external sheet are connected with the edge areas of the door internal sheet in the overlap joint by laser welding or in the fillet of the overlapping edge areas by laser welding or laser soldering.

4. A method according to claim 1, wherein in the visible area where the external sheet is inwardly bent, the internal sheet, too, is wholly or partly bent inwardly or outwardly in an edge area.

5. A method according to claim 4, wherein the bend of the external sheet forms an acute angle to the bend of the internal sheet.

6. A method according to claim 1, wherein the edge areas of the internal sheet are inwardly or outwardly bent by up to 180°.

7. A method according to claim 1, wherein the edge area of the internal sheet is arranged in parallel to the external sheet and the edge of the internal sheet is so bevelled that said edge of said internal sheet forms an acute angle to the bend of the external sheet.

8. A method for producing a motor vehicle part to be attached to a motor vehicle body, with the attached part having a visible edge area visible by a user of the motor vehicle and a hidden or not visible edge area that cannot be viewed by a user of the motor vehicle, the method comprising the steps of:

forming an internal sheet having an outer surface portion;

forming an external sheet produced separately from the internal sheet;

forming the visible edge area by bending the external sheet inwardly at a side by up to ninety degrees to form a bend and a bent portion, said visible edge area being visible from a position outside of said external sheet, said bent portion having an inner bent portion surface;

moving said internal sheet relative to said external sheet, in a direction of said inner bent portion surface, such that an edge area of said outer surface portion of the internal sheet is pushed against the inner bent portion surface to minimize a gap between the bent portion and the edge area of the internal sheet;

welding the internal sheet and the external sheet together by a laser beam directed into the gap between the edge area of the internal sheet and the bent portion adjacent to the bend of the external sheet after said internal sheet is moved in a direction of said bent portion, wherein said internal sheet and said external sheet define a component plane;

forming a hidden or not visible edge area by laying a flange end portion of the external sheet and a flange end portion of the internal sheet on each other to form overlapping flange end portions, at least a portion of said flange end portion of said external sheet being in direct contact with at least a portion of said flange end portion of said internal sheet, said hidden or not visible edge area not being visible from a position outside of said external sheet and said internal sheet, wherein said overlapping flange end portions extend in a direction parallel to said component plane;

laser-welding the overlapping flange portions together after said internal sheet and said external sheet are welded between the edge area and the bent portion and after said internal sheet is moved relative to said external sheet to form an overlap joint or laser-welding or laser-soldering in a fillet at overlapping flange portions to form an overlap joint, wherein at least a portion of said flange end portion of said internal sheet moves along at least a portion of said flange end portion of said external sheet when said edge area of said internal sheet is pushed against said bent portion of said external sheet.

9. A method according to claim 8, wherein the part is a motor vehicle door and the visible edge area of the external sheet is inwardly bent at a sill side and/or lock side of the door.

10. A method according to claim 9, wherein the not visible edge area is at a hinge side and/or a window side of the door external sheet.

11. A method according to claim 8, wherein the bend of the external sheet forms the bent portion at an acute angle to the internal sheet.

12. A method according to claim 8, wherein the edge areas of the internal sheet are inwardly or outwardly bent by up to 180°.

13. A method according to claim 8, wherein the edge area of the internal sheet is provided by bending an end in a direction away from the external sheet.

14. A method according to claim 8, wherein the edge area of the internal sheet is provided by bending an end in a direction toward the external sheet.

15. A method according to claim 8, wherein the edge area of the internal sheet is the end face of the internal sheet directed toward an inner surface of the bent portion of the external sheet.

16. A motor vehicle part to be attached to a motor vehicle body, comprising:

an external sheet comprising a visible edge area visible by a user of the motor vehicle, said external sheet being visible from a position outside said external sheet, wherein a side of said visible edge area of said external sheet is bent by an angle up to ninety degrees to form a bend and a bent portion, said bent portion having an inner surface; and an internal sheet comprising an outer surface and a hidden or not visible edge area that cannot be viewed by a user of the motor vehicle, said hidden or not visible edge area not being visible from a position outside of said external sheet and said internal sheet, said internal sheet and said external sheet defining a component plane, said internal sheet being produced separately from said external sheet, wherein said internal sheet is movable relative to said external sheet such that an edge area of said internal sheet is pushed in a direction of said inner surface of said bent portion in a non-welded state of said internal sheet and said external sheet to minimize a gap between the bent portion and the edge area of the internal sheet, wherein said inner surface of said bent portion engages at least a portion of said outer surface of said internal sheet, the internal sheet and the external sheet being welded together by a laser beam directed into the gap between the edge area of the internal sheet and the bent portion adjacent to the bend of the external sheet with said edge area of said internal sheet pushed against the bent portion, wherein the hidden or not visible edge area is an open flange end portion of the external sheet in contact with an open flange end portion of the internal sheet, said open flange end portion of said external sheet being movable along said open flange end portion of said internal sheet in said non-welded state, said open flange end portion of said external sheet and said open flange end portion of said internal sheet extending in a direction parallel to said component plane to form overlapping flange end portions, wherein the overlapping flange end portions are laser-welded together to form an overlap joint or laser-welded or laser-soldered fillet at the overlapping flange portions to form an overlap joint, wherein said overlap joint is formed after said edge area of the internal sheet is welded to said bent portion of said external sheet.

17. A motor vehicle part according to claim 16, wherein the part is a motor vehicle door and the visible edge area of the external sheet is inwardly bent at a sill side and/or lock side of the door and the not visible edge area is at a hinge side and/or a window side of the door external sheet.

18. A motor vehicle part according to claim 16, wherein the edge area of the internal sheet is provided by bending an end in a direction away from the external sheet or in a direction toward the external sheet.

19. A method according to claim 1, wherein said internal sheet is slidable against said external sheet in said component plane.

20. A motor vehicle part according to claim 16, wherein said flange end portion of said internal sheet is moved in a direction of said bent portion of said external sheet.

* * * * *